United States Patent
Bhat

(10) Patent No.: US 11,829,235 B1
(45) Date of Patent: Nov. 28, 2023

(54) RESPONSIVE ERROR HANDLING BASED ON OTHER ERROR REPORTS

(71) Applicant: Motorola Mobility LLC, Chicago, IL (US)

(72) Inventor: Bhavana Bhat, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/752,500

(22) Filed: May 24, 2022

(51) Int. Cl.
  *G06F 11/00* (2006.01)
  *G06F 11/07* (2006.01)

(52) U.S. Cl.
  CPC ...... *G06F 11/0784* (2013.01); *G06F 11/0709* (2013.01)

(58) Field of Classification Search
  CPC ............. G06F 11/0784; G06F 11/0769; G06F 11/0787; G06F 11/079; G06F 11/2252; G06F 11/2257; G06Q 30/01; G06Q 30/015; H04L 41/5074
  See application file for complete search history.

(56) References Cited

U.S. PATENT DOCUMENTS

| | | | | |
|---|---|---|---|---|
| 6,629,267 B1* | 9/2003 | Glerum | ............... | G06F 11/0787 714/38.11 |
| 8,806,570 B2 | 8/2014 | Barton et al. | | |
| 2010/0223372 A1 | 9/2010 | Nichols et al. | | |
| 2013/0262082 A1* | 10/2013 | McKeeman | ............ | G06F 40/20 704/9 |
| 2015/0100359 A1* | 4/2015 | Brunet | ............. | G06Q 10/06311 705/7.13 |
| 2017/0235660 A1* | 8/2017 | Chana | ................. | G06F 11/0793 714/38.14 |
| 2019/0377657 A1* | 12/2019 | McCauley | .......... | G06F 11/2294 |
| 2023/0065188 A1* | 3/2023 | Piagentini | ................ | G06N 5/02 |

FOREIGN PATENT DOCUMENTS

CA    2069236 C    10/1997

OTHER PUBLICATIONS

"Moto Care", Motorola Mobility LLC [retrieved May 18, 2022]. Retrieved from the Internet <https://motorola-mobility-en-in.custhelp.com/app/mcp/trackrepair2>., 4 Pages.

"Rescue and Smart Assistant Tool", Motorola Mobility LLC [retrieved May 18, 2022]. Retrieved from the Internet <https://motorola.com/us/rescue-and-smart-assistant/p>., May 11, 2017, 8 Pages.

* cited by examiner

Primary Examiner — Marc Duncan
(74) Attorney, Agent, or Firm — FIG. 1 Patents

(57) ABSTRACT

An error incident is determined to have occurred on an electronic device. Responsive to the error incident, a remote error logging system is queried for reports of the error incident by one or more additional electronic devices. The error incident is determined to have or have not been reported by the one or more additional electronic devices. A report of the error incident is transmitted to the remote error logging system based on the determination. An adjustment to the electronic device is applied to resolve the error incident. The adjustment is, for example, an amendment to the behavior of a component of the electronic device where the error incident occurred.

20 Claims, 9 Drawing Sheets

US 11,829,235 B1

RESPONSIVE ERROR HANDLING BASED ON OTHER ERROR REPORTS

BACKGROUND

As technology has advanced, electronic devices have become increasingly powerful and capable of performing a multitude of tasks. However, the performance of these tasks on electronic devices is not without its problems. A reoccurring error during the execution of one of these tasks, such as unexpected volume level reduction when playing a video or call drops, can lead to user frustration with their devices and applications. Online forums aimed at helping users address errors require users to communicate what the error is and/or understand how to report error-related data from a problematic device, resulting in many users giving up or purchasing a different product.

BRIEF DESCRIPTION OF THE DRAWINGS

Embodiments of an error reporting system are described with reference to the following drawings. The same numbers are used throughout the drawings to reference like features and components.

DETAILED DESCRIPTION

Error reporting is discussed herein. Generally, traditional error reporting practices rely on user input and interaction with an associated device via online forums to describe an error incident manually and effectively to a diagnosing user, manually collect error logs, and manually apply adjustments to fix the device. This often leads to long wait times between posts of the user and the diagnosing user in the online forum. When the error incident is critical, the user may give up on fixing the device or purchase a competitor product.

In contrast to traditional diagnostic practices, the techniques discussed herein automatically identify an error incident, automatically transmit error logs to an error logging system, and automatically apply adjustments to the device, such that an error incident can be diagnosed and addressed in a prompt manner. More specifically, for example, an error reporting system determines that an error incident has occurred on an electronic device, such as an unexpected volume level increase. The error reporting system queries a remote error logging system to determine whether the error incident or a similar error incident has been logged previously from a different device. In some instances, the error reporting system receives a query result indicating that neither the error incident nor a similar error incident has been logged, and the error reporting system transmits a report of the error incident to the remote logging system for logging. In some instances, the query result indicates that a similar error incident has been logged, and the error reporting system transmits a differential report of the error incident to the remote logging system for logging based on a report of the query result. In some instances, the query result indicates that the error incident has been logged and a corresponding adjustment is received that was successful in preventing the error incident, and the error reporting system applies the adjustment to the electronic device.

The techniques discussed herein improve the operation of an electronic device by not requiring a user to diagnose and address error incidents on associated devices. Rather, the error reporting system via the remote error logging system automatically diagnoses and adapts the device to prevent the error incident from occurring again. Additionally, the techniques discussed herein improve the operation of an electronic device by determining differential reports on the error incident for logging by the remote error logging system. The differential reports reduce the storage required to log the instances of an error instance across a plurality of devices. The remote error logging system learns from the differential reports to address future error incidents.

Figure 1:
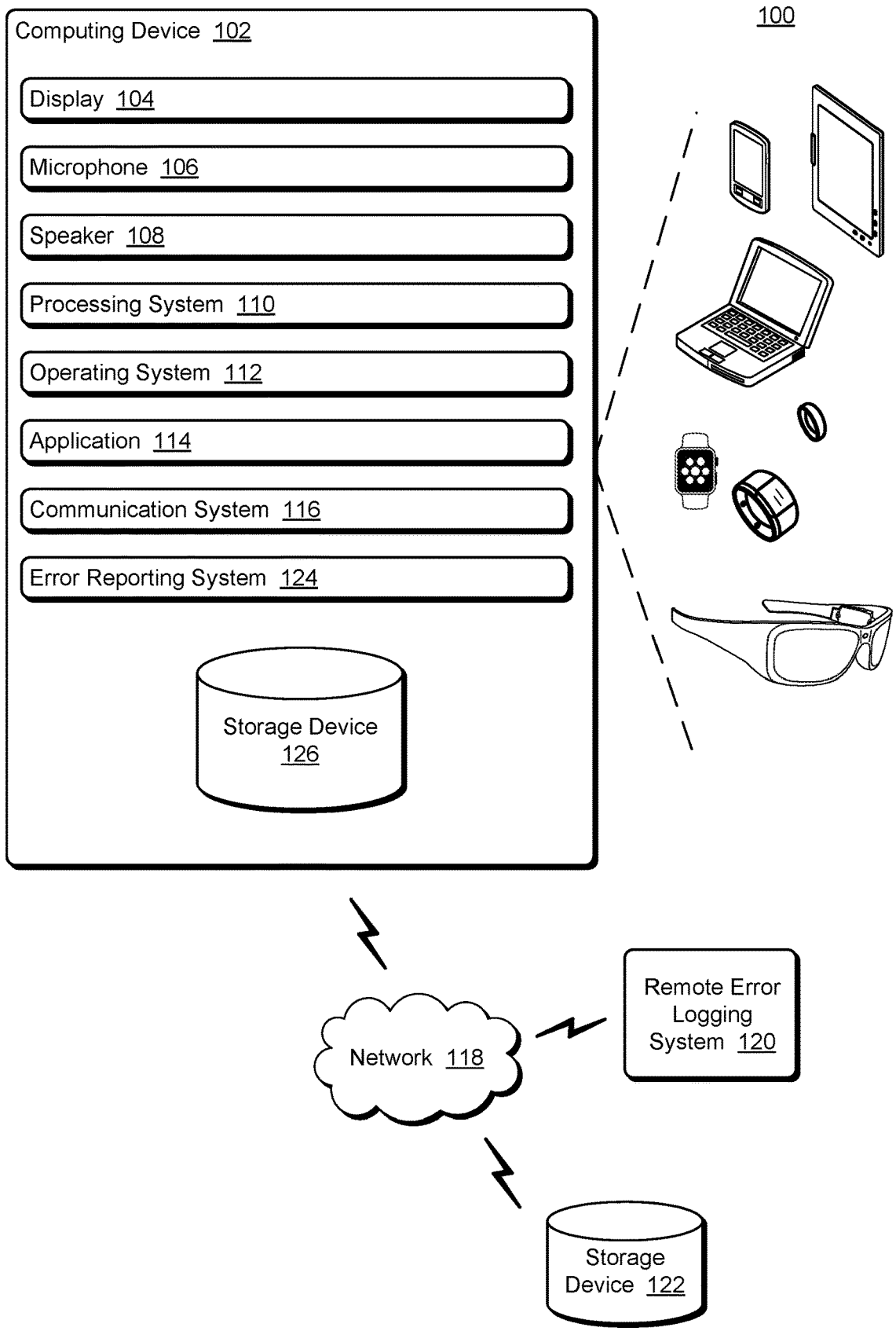
FIG. 1 illustrates an example system including a computing device implementing the techniques discussed herein.

FIG. 1 illustrates an example system 100 including a computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive or other vehicle on-board computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processing system 110 that includes one or more processors, each of which can include one or more cores. The processing system 110 is coupled with, and may implement functionalities of, any other components or modules of the computing device 102 that are described herein. In one or more embodiments, the processing system 110 includes a single processor having a single core. Alternatively, the processing system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102 and operates as an interface between applications 114 and hardware components of the computing device 102.

The computing device 102 also includes a communication system 116. The communication system 116 manages communication with various other devices, including establishing voice calls with other devices, sending electronic communications to and receiving electronic communications from other devices, and so forth. The content of these electronic communications and the recipients of these electronic communications is managed by an application 114 or the operating system 112. This management of the content and recipients can include displaying received electronic communications, providing a user interface to compose a new electronic communication or reply to a received electronic communication, select recipients for an electronic communication, display natural language responses, and so forth.

The devices with which the computing device 102 communicates can be any of a variety of types of devices, analogous to the discussion above regarding the computing device 102. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, email, group based chat messaging system, and so forth. This communication can be carried out over a network, which can be any of a variety of different networks 118, including the Internet, a local area network (LAN), a public telephone network, a cellular network (e.g., a third generation (3G) network, a fourth generation (4G) network, a fifth generation (5G) network), an intranet, other public or proprietary networks, combinations thereof, and so forth. The computing device 102 can thus communicate with other devices wirelessly and accordingly is also referred to as a wireless device. A remote error logging system 120 can be implemented on one or more of the devices. A storage device 122 can be implemented on one or more of the devices.

The computing device 102 also includes an error reporting system 124. The error reporting system 124 determines whether an error incident has occurred on the computing device 102 and queries the remote error logging system 120 for logged reports that correspond to the error incident. The query is provided to an application 114 or the operating system 112 managing electronic communications. This application 114 or the operating system 112 sends, via the communication system 116, the query to the remote error logging system 120. The error reporting system 124 determines, based on the received query result from the remote error logging system 120, content for a report that is transmitted to the remote error logging system 120. The error reporting system 124 receives an adjustment to correct the error on the computing device 102 and applies the adjustment to the computing device 102.

The error reporting system 124 can be implemented in a variety of different manners. For example, the error reporting system 124 can be implemented as multiple instructions stored on computer-readable storage media and that can be executed by the processing system 110. Additionally or alternatively, the error reporting system 124 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The computing device 102 also includes a storage device 126. The storage device 126 can be implemented using any of a variety of storage technologies, such as magnetic disk, optical disc, Flash or other solid state memory, and so forth. The storage device 126 can store various program instructions and data for any one or more of the operating system 112, application 114, and the error reporting system 124. The storage device 122 can store various program instructions and data, analogous to the discussion above regarding the storage device 126.

The remote error logging system 120 receives a query associated with the error incident from the error reporting system 124. The remote error logging system 120 analyzes logged reports related the error incident. If a logged report is identified, the remote error logging system determines potential adjustments to a device, e.g., the computing device 102, and transmits the adjustment to the device. In some instances, the logged reports are stored on the storage device 126.

Figure 2:
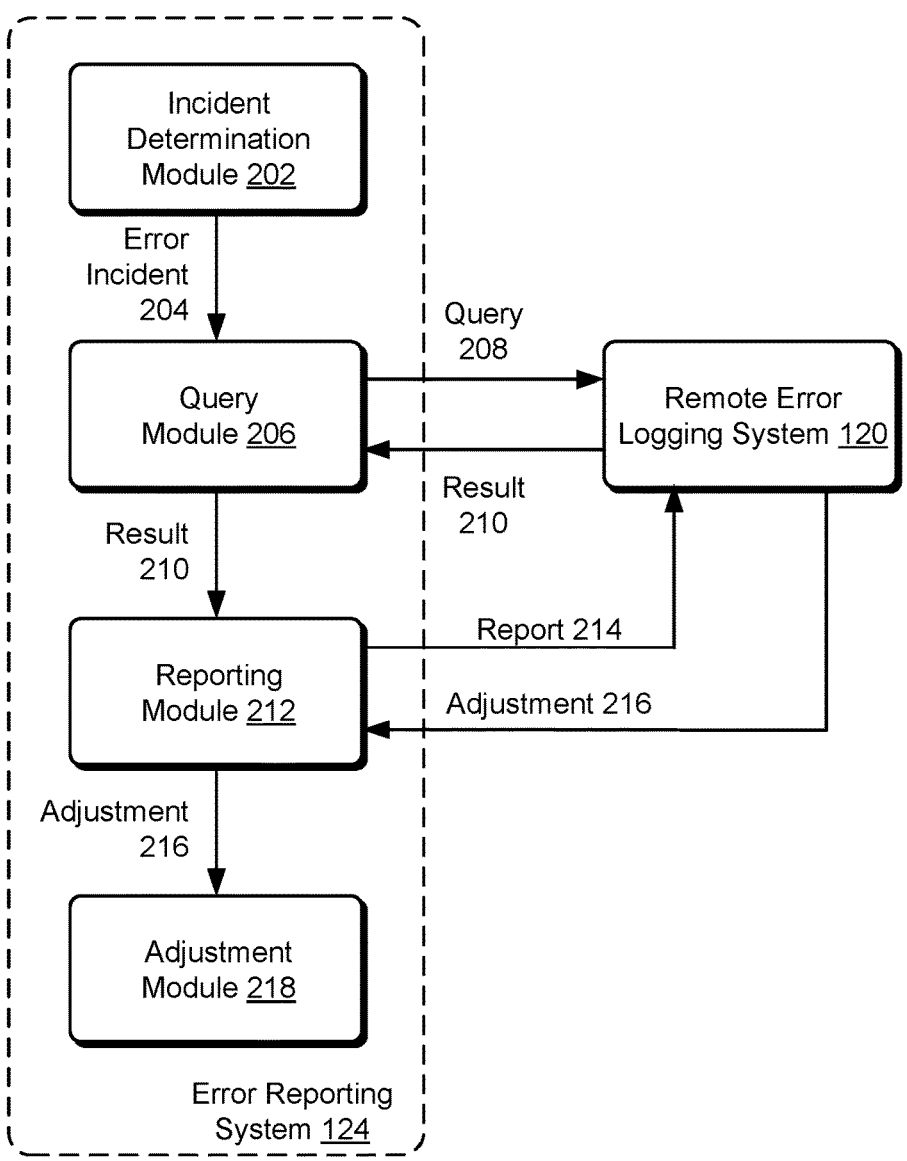
FIG. 2 illustrates an example system implementing the techniques discussed herein.

FIG. 2 illustrates an example system 200 implementing the techniques discussed herein. The example system 200 includes an error reporting system 124 that handles error incidents on a device. Handling of an error incident refers to one or more of identifying the error incident, reporting the error incident, identifying and transmitting an adjustment for an error incident, and adjusting for the error incident. The error reporting system 124 includes an incident determination module 202 that implements functionality to determine whether an error incident 204 has occurred on a device, e.g., the computing device 102. Examples of the error incident 204 include errors that relate to one or more components or applications of the device, hardware errors, software errors, and so forth. For example, the incident determination module 202 determines an error incident of unexpected volume drops based on receiving an initial bug report from the device.

The error reporting system 124 includes a query module 206 that implements functionality to generate a query 208 based on the error incident 204. For example, the query 208 includes identification of the error incident (e.g., via an identification number), information describing the error incident, such as the change in volume and/or the application 114 that was playing video, and so forth. Then, the query module 206 transmits the query 208 to the remote error logging system 120. The query module 206 receives a query result 210 from the remote error logging system 120. The result 210 is an indication of whether the remote error logging system 120 found a logged report (e.g., previous reports from other devices that correspond with the error incident 204), and/or whether additional information is needed from the error reporting system 124.

A reporting module 212 is included in the error reporting system 124 that implements functionality to generate a report 214 of the error incident 204 for the remote error logging system 120. The report 214 is logged by the remote error logging system 120, e.g., stored in the storage device 122. The reporting module 212 receives an adjustment 216 to modify the device based on the error incident, e.g., based on the query 208 and/or the report 214.

The error reporting system 124 includes an adjustment module 218 that implements functionality to apply the adjustment 216 to the device. Examples of an adjustment 216 includes a change in settings of the device, a change in interaction between the device and one or more applications on the device, a modification in software of the device, an instruction to amend a sequence of behavior of the device, and so forth. In the example of the volume drop during a video, the adjustment 216 is applied to the sound settings of the device, such as resetting the sound settings to a basic mode.

In some instances, the query 208 includes sufficient information for the remote error logging system 120 to determine an adjustment 216, such that a report need not be generated. However, in some further instances if the adjustment 216 after application does not address the error incident, then the reporting module 212 generates a report 214. In some instances, the reporting module 212 and the adjustment module 218 can operate in parallel. In some instances, the reporting module 212 generates additional reports based on additional information requests from the remote error logging system 120.

Figure 3:
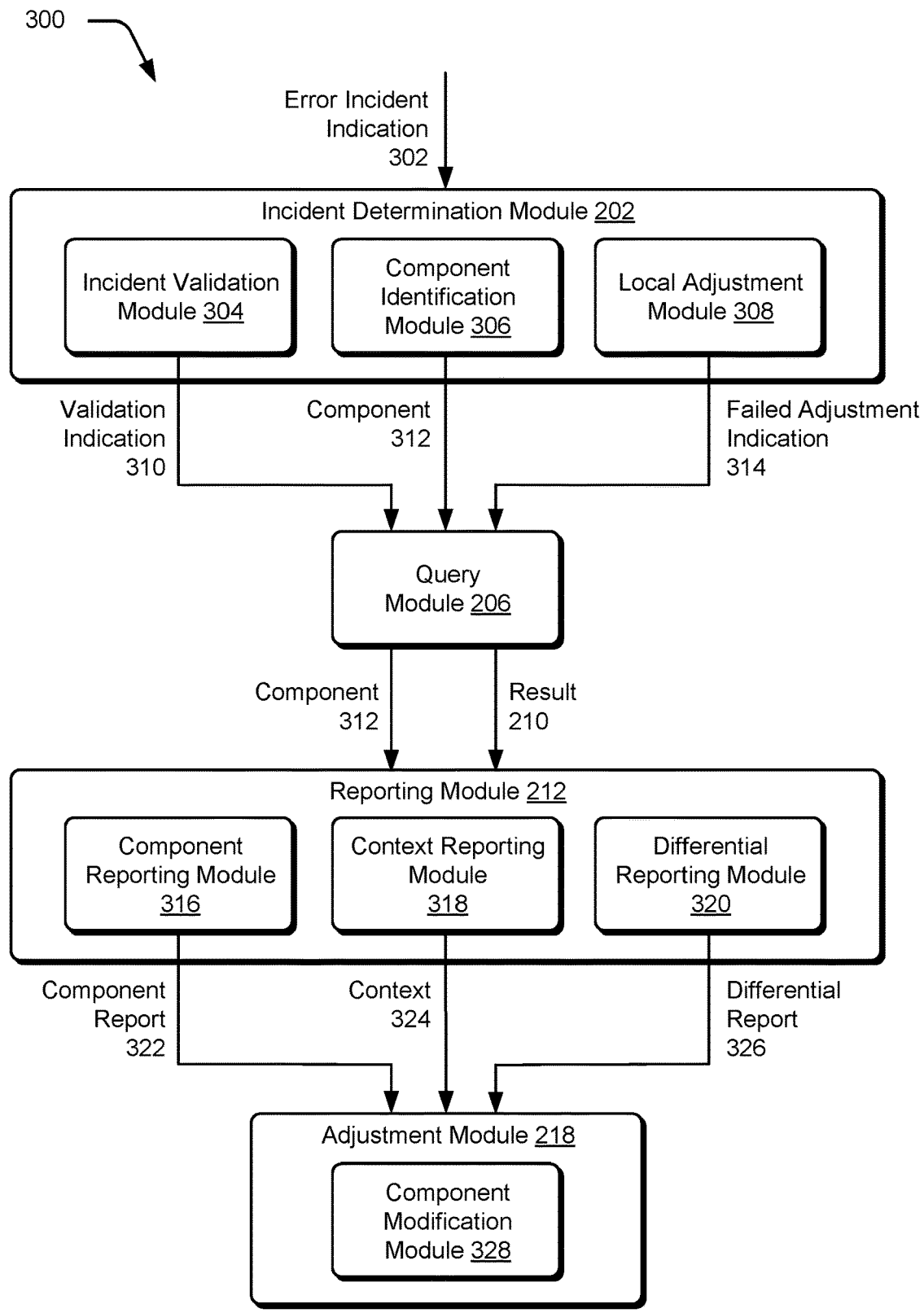
FIG. 3 illustrates an example of error reporting and adjusting an electronic device.

FIG. 3 illustrates an example 300 of error reporting and adjusting an electronic device. The incident determination module 202 receives an error incident indication 302. Examples of the error incident indication 302 include a user input indicating an error incident, an indication from part of the device identifying a bug, a detected anomaly, and so forth. The incident determination module 202 includes an incident validation module 304, a component identification module 306, and a local adjustment module 308.

The incident validation module 304 implements functionality to determine the validity of the error incident indication 302. In some instances, the incident validation module 304 determines a timeframe for the error incident indication 302. For example, the incident validation module 304 identifies user inputs (e.g., changing the volume manually during a volume drop) that occurred during the timeframe for the error incident indication 302. If a user input is identified as corresponding directly with the error incident indication 302 (e.g., adjusting the volume down), for instance, the incident validation module 304 determines that the error incident indication 302 is invalid. However, if the error incident indication 302 is not the first error incident indication of a corresponding type (e.g., identified via ID number), for instance, the incident validation module 304 determines that the error incident indication 302 is valid, e.g., based on repeated error incident indications.

For another example, when a call drop happens on the device, a phone component within the device could detect whether the call drop is a genuine call drop by checking the signal strength and other relevant parameters and provide a validation indication 310 to the incident validation module 304. In some instances, the incident validation module 304 determines that the error incident indication 302 is valid based on identifying a bug in a bug report of the device. In this way, the error reporting system 124 reduces the number of queries transmitted to the remote error logging system 120 by querying when the error incident indication is determined as valid (e.g., via a validation indication 310).

The component identification module 306 can implement functionality to identify one or more components associated with the error incident indication 302. In the example of volume drops during playing a video, the component identification module 306 identifies the speaker 108, the operating system 112, and an application 114 that plays video as associated components. The component identification module 306 analyzes the components to identify bugs corresponding to a respective component or the communication between respective components. The component identification module 306 selects one or more components 312 for querying. In some instances, the components 312 are put into a self-defense mode, such that inputs, outputs, and internal steps within the component are stored, e.g., in the storage device 126.

The local adjustment module 308 can implement functionality to adjust a component 312 and/or settings of the device to address the error incident indication 302 locally. The local adjustment module determines whether the error incident indication 302 can be troubleshooted and/or debugged locally. In instances where the local adjustment module 308 cannot troubleshoot the error incident locally, the local adjustment module 308 provides a failed adjustment indication 314 to the query module 206. In this way, the error reporting system 124 reduces the number of queries transmitted to the remote error logging system 120 by querying when the error incident cannot be resolved locally.

The query module 206 transmits a query 208 to the remote error logging system 120. In some instances, the query 208 indicates the components 312 identified, e.g., via multiple queries for each component 312. The query module 206 receives a result 210 from the remote error logging system 120. Example data of the result 210 includes a report from an additional device of the same error incident and/or a similar error incident, an adjustment 216, an information request, and so forth. Examples of the information request include a level of information request (e.g., more detailed based on the information in the query not being sufficient), a type of information request (e.g., a debug report, trace report, additional information), a component information request (e.g., on a component that has or has not been identified), a contextual information request (e.g., what user inputs were received during the timeframe of the error incident), and so on.

The reporting module 212 includes a component reporting module 316, a context reporting module 318, and a differential reporting module 320 to generate a report 214. Example data in the report 214 includes a component report 322, context 324, and a differential report 326. The component reporting module 316 can implement functionality to collect and/or record data from a component, such as a bug report. For instance, the component reporting module 316 collects data from a component identified by an information request from the remote error logging system 120.

The context reporting module 318 can implement functionality to collect and/or record context 324 that may be relevant to the error incident. Examples of context 324 include settings of the device, location of the device, user inputs received during the timeframe of the error incident, and so forth. For example, if the error incident is a call drop, the context reporting module 318 determines the location of the device at the time of the call drop and/or whether the device had a weak signal at that location.

The reporting module 212 implements enhanced techniques to generate relevant reports for the remote error logging system 120. The differential reporting module 320 generates a differential report 326. In some instances, the differential reporting module 320 determines differences between reports from the device and received reports from the result 210. In some instances, the differential reporting module 320 determines differences between previous reports transmitted to the remote error logging system 120 and current reports from the most recent error incident event. In this way, duplicate reports need not be transmitted to the remote error logging system 120, saving computational resources. In some instances, the reporting module 212 optimizes the file size of the report 214, e.g., by compressing and/or encoding the report 214.

The adjustment module 218 includes a component modification module 328. The component modification module 328 determines what component or components the adjustment 216 is to be applied to. In some instances, a plurality of adjustments is received and applied to a plurality of components. In some instances, the plurality of adjustments is applied in sequence until the error incident is corrected by a particular adjustment. This particular adjustment can be reported to the remote error logging system 120 to inform subsequent queries. For each adjustment, an adjustment success indication, for instance, is transmitted to the remote error logging system 120, as further described in FIG. 5.

Figure 4:
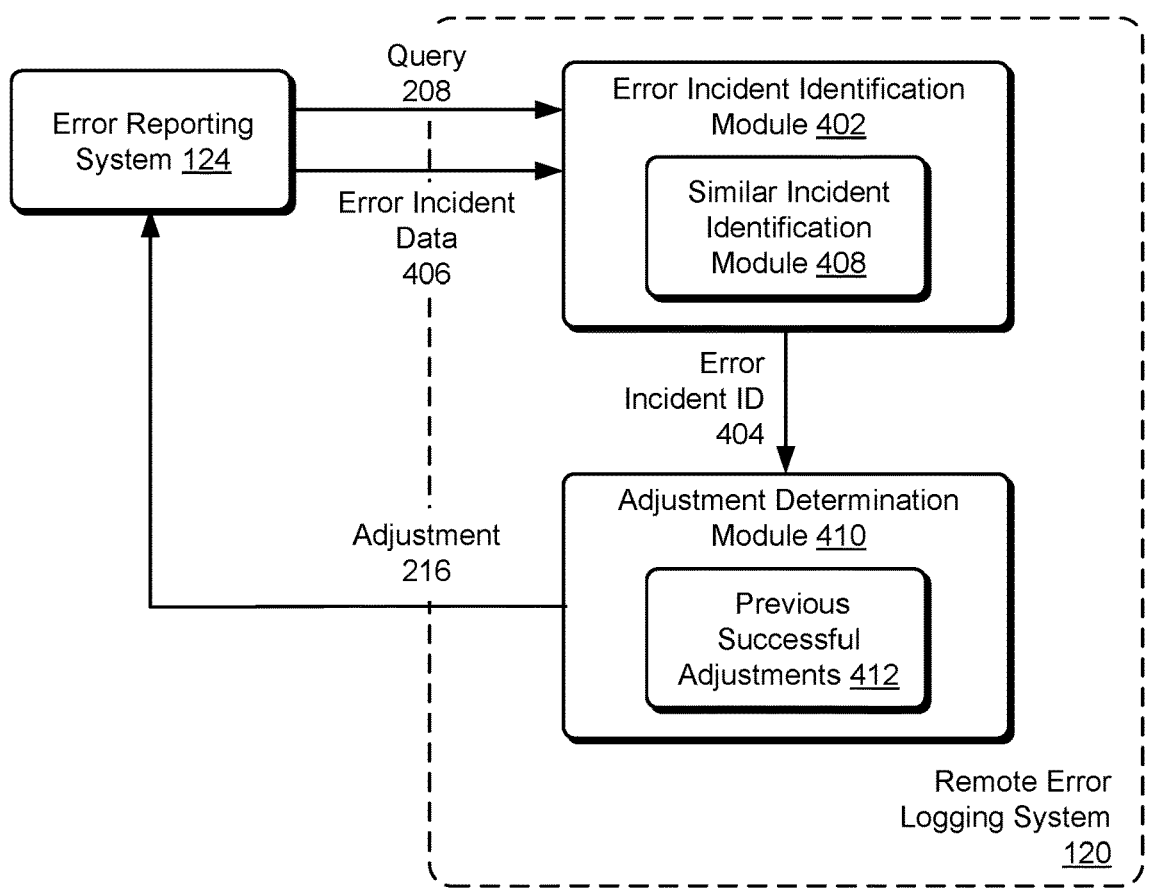
FIG. 4 illustrates an example system implementing the techniques discussed herein.

FIG. 4 illustrates an example system 400 implementing the techniques discussed herein. The remote error logging system 120 includes an error incident identification module 402 that implements functionality to determine the identity of the error incident 204. The error incident identification module 402 receives a query 208 from the error reporting system 124 (e.g., a remote electronic device). Based on the query 208, the error incident identification module 402 determines whether the query 208 includes sufficient information to identify other events of the error incident 204. The error incident identification module 402 compares the query 208 to logged error incidents stored in the storage device 122. In some instances, the error incident identification module 402 identifies and assigns the error incident 204 an error incident ID 404. The error incident ID 404, for example, includes a ID that identifies the subject query and/or a common ID that identifies the type of error incident event.

In some instances, the error incident identification module 402 cannot identify the error incident 204 in the logged error incidents without additional information on the error incident 204. As such, error incident data 406 is provided to the error incident identification module 402 from the error reporting system 124, e.g., via a request from the error incident identification module 402.

The error incident identification module 402 includes a similar incident identification module 408 that implements functionality to determine similar error incidents to the error incident 204, e.g., based on a similarity threshold. In some instances, the similar incident identification module 408 compares previous error incident events to the error incident 204, such as based on component similarity, device similarity, settings similarity, and so forth. In some instances, the similar incident identification module 408 utilizes machine learning techniques to train a model using training data of similar logged error incidents and corresponding successful adjustments. In some instances where there are similar error incidents, the similar incident identification module 408 requests a differential report from the error reporting system 124 or generates a differential report, and the differential report is logged in the storage device 122.

In some instances where no logged error incident corresponds or is similar to the error incident of the query 208, the remote error logging system 120 logs the query 208 and the error incident data 406 (e.g., data of the report 214 as described in FIG. 2) into the storage device 122. In some instances, the remote error logging system 120 generates and transmits a request to a diagnosing user (e.g., a user associated with the remote error logging system 120) to identify an adjustment for the device of the error incident 204.

The remote error logging system 120 further includes an adjustment determination module 410 that implements functionality to determine an adjustment 216 to transmit to the error reporting system 124. The adjustment determination module 410 identifies previous successful adjustments 412 from logged error incidents, e.g., similar or same error incident events. Based on the level of similarity to a logged error incident, the adjustment determination module selects an adjustment 216, e.g., via ranking the level of similarities of the previous successful adjustments. In some instances, the adjustment 216 is selected based on the adjustment 216 working on a plurality of different error incidents. For example, some devices that previously queried the remote error logging system 120 have different logged error incidents related to volume (e.g., volume dropping while playing music, volume increasing during a phone call) than the error incident 204 (e.g., volume dropping during video playing), and the adjustment 216 (e.g., resetting a volume setting) was successful for the different logged error incidents. In some instances, the adjustment 216 is selected based on reports on the effectiveness of the adjustment, e.g., whether the adjustment was successful at preventing the error incident from occurring again.

Figure 5:
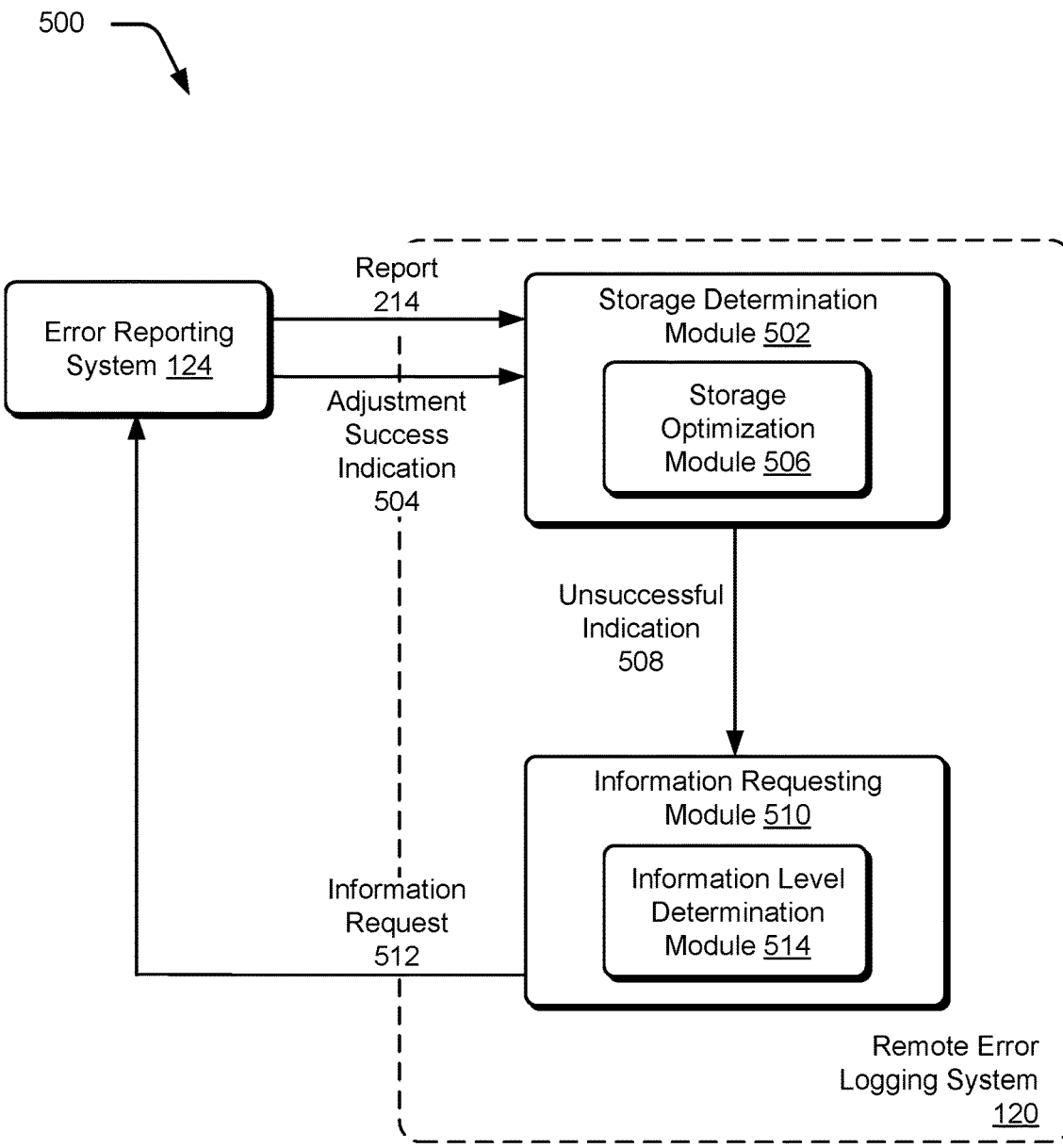
FIG. 5 illustrates another example system implementing the techniques discussed herein.

FIG. 5 illustrates another example system 500 implementing the techniques discussed herein. The remote error logging system 120 includes a storage determination module 502 that implements functionality to determine which data from the error reporting system 124 to log. The storage determination module 502 receives one or more reports 214 and an adjustment success indication 504 from the error reporting system 124. The adjustment success indication 504 identifies whether an adjustment 216 was successful in preventing an error incident from occurring again on the computing device 102.

The storage determination module 502 includes a storage optimization module 506 that implements functionality to optimize the storage of logs in the storage device 122. In some instances, the storage optimization module 506 utilizes a model trained using machine learning techniques to optimize the storage. In some instances, the storage optimization module 506 determines differential reports between the reports 214 and logged reports. In some instances where there is not a difference between the current and logged reports, the storage optimization module 506 generates or adds to an incident count for a particular type of error incident. In this way, duplicate error incidents need not be logged individually, and data for similar error incidents is reduced.

In some instances, an unsuccessful adjustment indication 508 is provided to an information requesting module 510. Included in the remote error logging system 120, the information requesting module 510 implements functionality to determine what information to request from the error reporting system 124. The information requesting module 510 generates an information request 512 based on the received data from the error reporting system 124, e.g., the reports 214 and the adjustment success indication 504, as described in the description of FIG. 2.

The information requesting module 510 includes an information level determination module 514. The information level determination module 514 implements functionality to determine a level of information to request from the computing device 102. In some instances, the level of information is determined based on a learned level of information via a model trained using machine learning. This level of information indicates that the remote error logging system 120 would be aided with more information than the information that has been provided so far, e.g., the query 208 and the reports 214.

Figure 6:
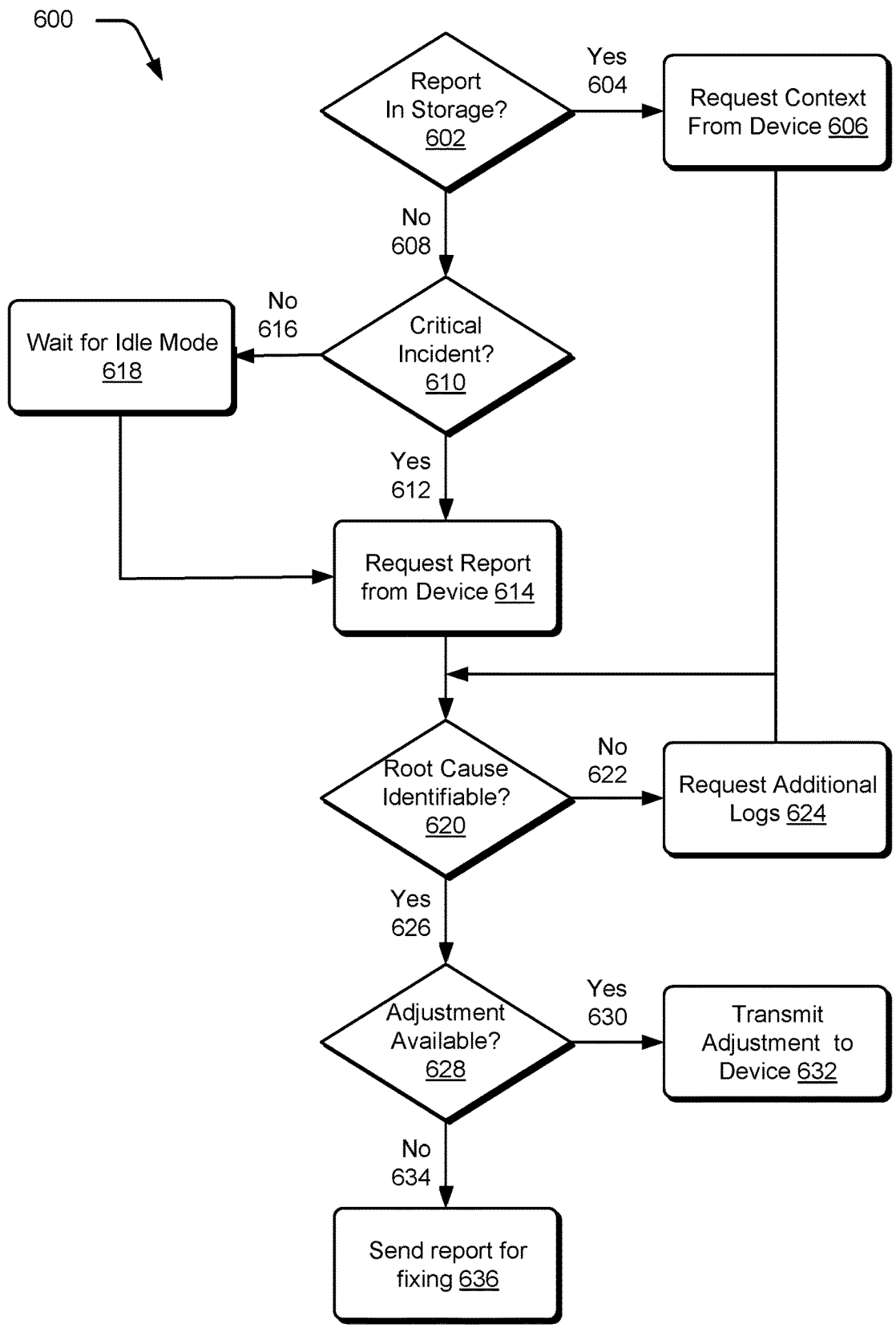
FIG. 6 illustrates an example process for implementing the techniques discussed herein in accordance with one or more embodiments.

FIG. 6 illustrates an example process 600 for implementing the techniques discussed herein in accordance with one or more embodiments. Process 600 is carried out by a remote error logging system, such as the remote error logging system 120 of FIG. 1, and can be implemented in software, firmware, hardware, or combinations thereof. Process 600 is shown as a set of acts and is not limited to the order shown for performing the operations of the various acts.

The remote error logging system determines whether a report of a previous error incident that corresponds with the error incident is in storage, e.g., the storage device 122 (act 602). If the report is in storage (act 604), the remote error logging system requests context from the device (act 606), e.g., from the error reporting system 124. If a corresponding report is not found in storage (act 608), the remote error logging system determines whether the error incident is a critical incident (act 610). If the error incident is a critical incident (act 612), the remote error logging system requests a report from the device (act 614), e.g., from the error reporting system 124. If the error incident is not a critical incident (act 616), the remote error logging system determines whether the device is in idle mode (e.g., in a locked configuration, in a sleep configuration) and waits until the device is in idle mode (act 618). Once the device enters idle mode, the remote error logging system requests a report from the device (act 614), e.g., from the error reporting system 124.

The remote error logging system then determines whether the root cause of the error incident is identifiable (act 620). If the root cause is not identifiable (act 622), the remote error logging system requests additional logs or data from the device until the root cause is identifiable (act 624). If the root cause is identifiable (act 626), the remote error logging system determines whether there is an adjustment available for the root cause (act 628). If there is an adjustment available (act 630), the remote error logging system transmits the adjustment to the device for application (act 632). If there is not an adjustment available (act 634), the remote error logging system sends the report to a diagnostic system to determine an adjustment that will fix the device (act 636), such that the error incident does not happen again.

Figure 7:
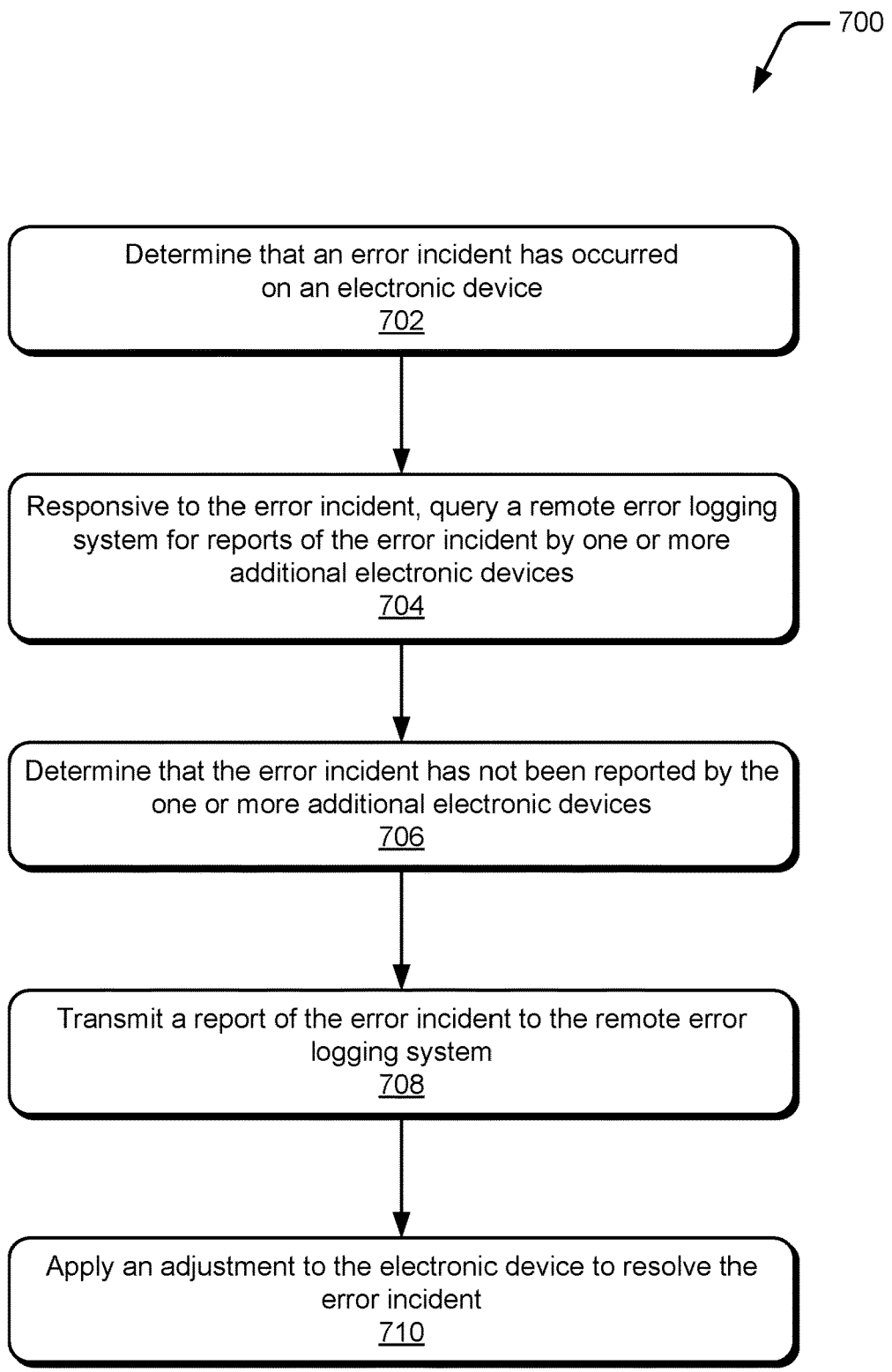
FIG. 7 illustrates another example process for implementing the techniques discussed herein in accordance with one or more embodiments.

FIG. 7 illustrates an example process 700 for implementing the techniques discussed herein in accordance with one or more embodiments. Process 700 is carried out by a communication system, an application, and an error reporting system, or a combination thereof, such as communication system 116, application 114, and error reporting system 124 of FIG. 1, and can be implemented in software, firmware, hardware, or combinations thereof. Process 700 is shown as a set of acts and is not limited to the order shown for performing the operations of the various acts.

In process 700, an error incident is determined to have occurred on an electronic device (act 702). The error incident is determined in various manners, such as by receiving a bug report from a component of the electronic device.

Responsive to the error incident, a remote error logging system is queried for reports of the error incident by one or more additional electronic devices (act 704). The remote error logging system is, for example, a separate system to the electronic device that logs error incident events and transmits adjustments to prevent the error incidents from happening again. The query is, for example, part of the bug report that identifies what happened and what was supposed to happen on the electronic device.

The error incident is determined to not have been reported by the one or more additional electronic devices (act 706). The determination is, for example, based on a received query result indicating no same or similar error incidents.

A report of the error incident is transmitted to the remote error logging system (act 708). The report includes, for example, a detailed bug report from the component of the electronic device.

An adjustment to the electronic device is applied to resolve the error incident (act 710). The adjustment is, for example, an amendment to the behavior of the component of the electronic device.

Figure 8:
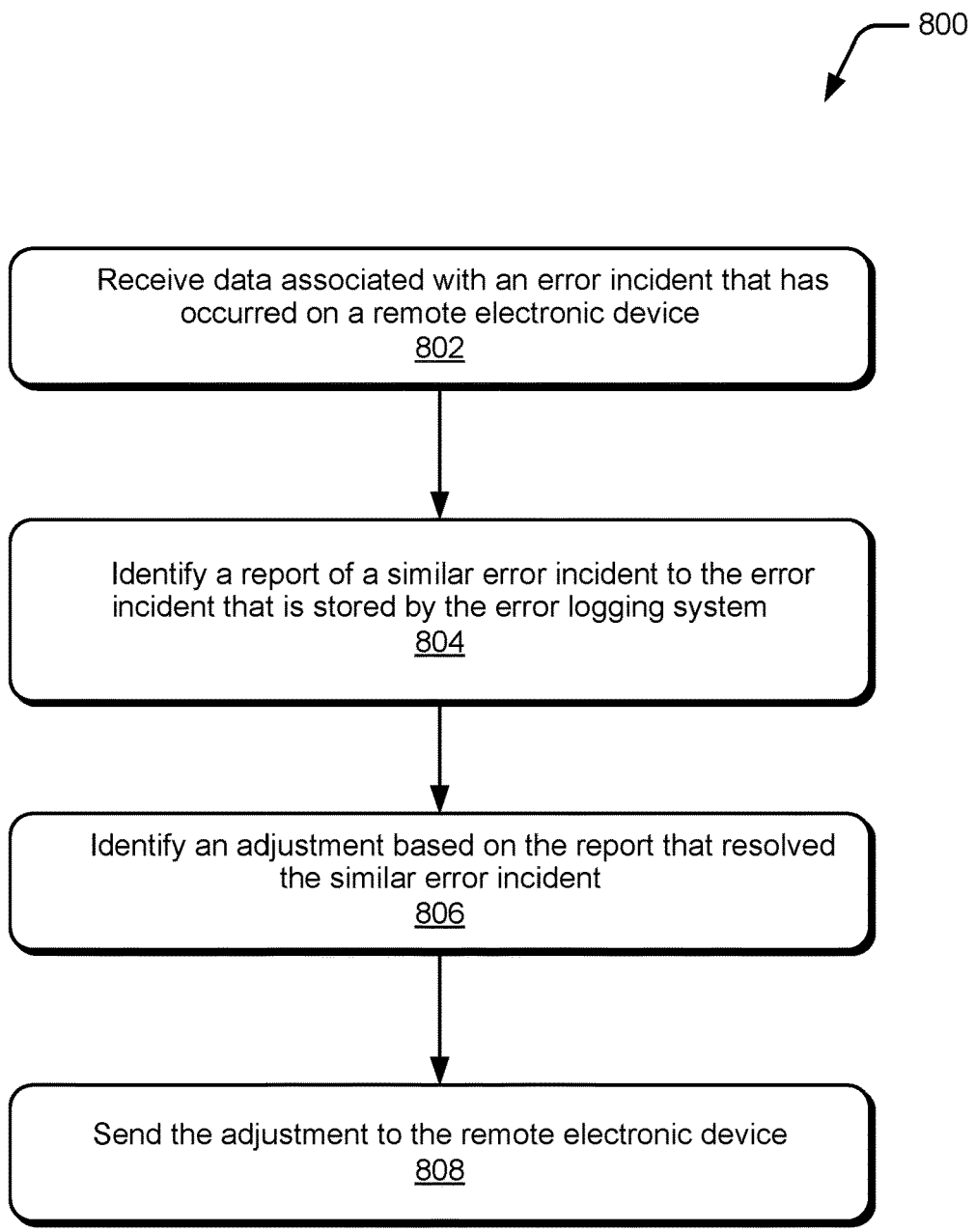
FIG. 8 illustrates another example process for implementing the techniques discussed herein in accordance with one or more embodiments.

FIG. 8 illustrates an example process 800 for implementing the techniques discussed herein in accordance with one or more embodiments. Process 800 is carried out by a storage device and a remote error logging system, such as storage device 122 and remote error logging system 120 of FIG. 1, and can be implemented in software, firmware, hardware, or combinations thereof. Process 800 is shown as a set of acts and is not limited to the order shown for performing the operations of the various acts.

In process 800, data associated with an error incident that has occurred on a remote electronic device is received (act 802). The data is received, for instance, via an error reporting system associated with the remote electronic device.

A report of a similar error incident to the error incident that is stored is identified by the error logging system (act 804). The report of the similar error incident is identified, for example, by determining a level of similarity between the data associated with the error incident and reports logged with the error logging system.

An adjustment is identified based on the report that resolved the similar error incident (act 806). The adjustment is, for example, a change to the settings on a device of the similar error incident.

The adjustment is sent to the remote electronic device (act 808). An adjustment success indication, for example, is received by the error logging system to indicate an end to the diagnosing of the error incident.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
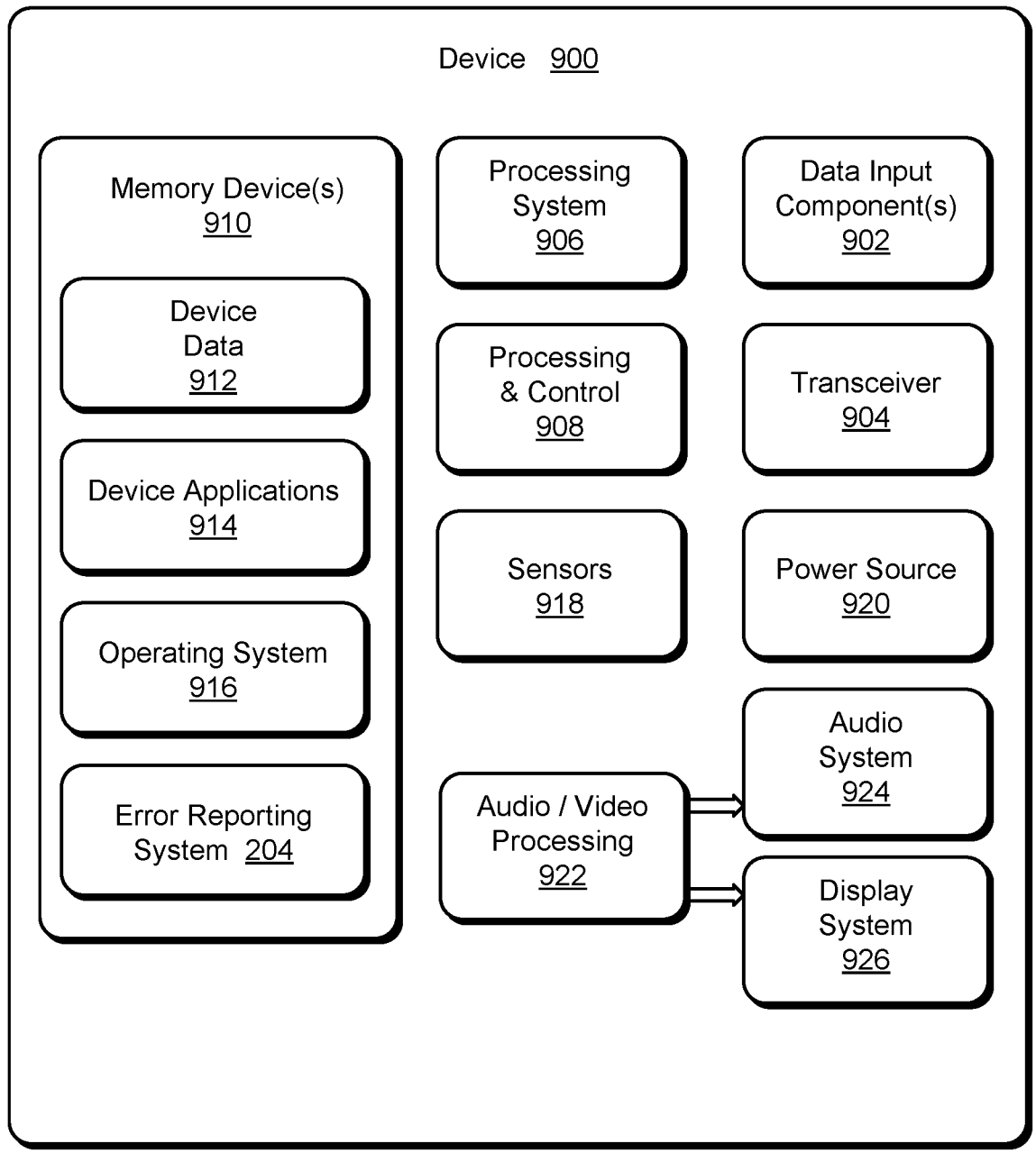
FIG. 9 illustrates various components of an example electronic device that can implement embodiments of the techniques discussed herein.

FIG. 9 illustrates various components of an example electronic device that can implement embodiments of the techniques discussed herein. The electronic device 900 can be implemented as any of the devices described with reference to the previous FIG.s, such as any type of client device, mobile phone, tablet, computing, communication, entertainment, gaming, media playback, or other type of electronic device. In one or more embodiments the electronic device 900 implements the error reporting system 124, described above.

The electronic device 900 includes one or more data input components 902 via which any type of data, media content, or inputs can be received such as user-selectable inputs, messages, music, television content, recorded video content, and any other type of text, audio, video, or image data received from any content or data source. The data input components 902 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 902 may also include various other input components such as microphones, touch sensors, touchscreens, keyboards, and so forth.

The device 900 includes communication transceivers 904 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 900 includes a processing system 906 of one or more processors (e.g., any of microprocessors, controllers, and the like) or a processor and memory system implemented as a system-on-chip (SoC) that processes computer-executable instructions. The processing system 906 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 908. The device 900 may further include any type of a system bus or other data and command transfer system that couples the various components within the device. A system bus can include any one or combination of different bus structures and architectures, as well as control and data lines.

The device 900 also includes computer-readable storage memory devices 910 that enable data storage, such as data storage devices that can be accessed by a computing device, and that provide persistent storage of data and executable instructions (e.g., software applications, programs, functions, and the like). Examples of the computer-readable storage memory devices 910 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media or medium in various memory device configurations. The device 900 may also include a mass storage media device.

The computer-readable storage memory device 910 provides data storage mechanisms to store the device data 912, other types of information or data, and various device applications 914 (e.g., software applications). For example, an operating system 916 can be maintained as software instructions with a memory device and executed by the processing system 906. The device applications 914 may also include a device manager, such as any form of a control application, software application, signal-processing and control module, code that is native to a particular device, a hardware abstraction layer for a particular device, and so on.

The device 900 can also include one or more device sensors 918, such as any one or more of an ambient light sensor, a proximity sensor, a touch sensor, an infrared (IR) sensor, accelerometer, gyroscope, thermal sensor, audio sensor (e.g., microphone), and the like. The device 900 can also include one or more power sources 920, such as when the device 900 is implemented as a mobile device. The power sources 920 may include a charging or power system, and can be implemented as a flexible strip battery, a rechargeable battery, a charged super-capacitor, or any other type of active or passive power source.

The device 900 additionally includes an audio or video processing system 922 that generates one or both of audio data for an audio system 924 and display data for a display system 926. In accordance with some embodiments, the audio/video processing system 922 is configured to receive call audio data from the transceiver 904 and communicate the call audio data to the audio system 924 for playback at the device 900. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for error reporting have been described in language specific to features or methods, the subject of the appended claims is not necessarily limited to the specific features or methods described and recited. Rather, the specific features and methods are disclosed as example implementations of techniques for implementing error reporting. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method, including: determining that an error incident has occurred on an electronic device; responsive to the error incident, querying a remote error logging system for reports of the error incident by one or more additional electronic devices; determining that the error incident has not been reported by the one or more additional electronic devices; and transmitting, by the electronic device, a report of the error incident to the remote error logging system.

In some aspects, the techniques described herein relate to a method, further including: determining that the error incident has been reported by the one or more additional electronic devices; and applying an adjustment to the electronic device based on adjustments applied to the one or more additional electronic devices.

In some aspects, the techniques described herein relate to a method, further including: determining a component of the electronic device where the error incident occurred; identifying an additional report of the error incident on the component; and transmitting the additional report to the remote error logging system.

In some aspects, the techniques described herein relate to a method, the querying the remote error logging system for the reports of the error incident by the one or more additional electronic devices including: debugging the component on the electronic device; and determining that no local modification is available.

In some aspects, the techniques described herein relate to a method, the determining that the error incident has occurred on the electronic device including determining a validity of the error incident.

In some aspects, the techniques described herein relate to a method, further including: receiving a level of information requested from the remote error logging system; and transmitting an additional report to the remote error logging system based on the level of information.

In some aspects, the techniques described herein relate to a method, wherein the report includes at least one of contextual information, component information, or device information.

In some aspects, the techniques described herein relate to a computing device including: a processor implemented in hardware; and a computer-readable storage medium having stored there on multiple instructions that, responsive to execution by the processor, cause the processor to perform acts including: determining, by the computing device, that an error incident has occurred; responsive to the error incident, querying a remote error logging system for reports of the error incident; determining, based on a received query result from the remote error logging system, a differential report indicating a difference between reports of the received query result and the error incident; and transmitting, by the computing device, the differential report of the error incident to the remote error logging system.

In some aspects, the techniques described herein relate to a computing device, the acts further including: determining that the error incident has been reported to the remote error logging system based on the received query result; and applying an adjustment to the computing device based on the received query result.

In some aspects, the techniques described herein relate to a computing device, the acts further including: determining a component of the computing device where the error incident occurred; identifying a report of the error incident on the component; and transmitting the report to the remote error logging system.

In some aspects, the techniques described herein relate to a computing device, the querying the remote error logging system for the reports of the error incident including: debugging the component on the computing device; and determining that a local adjustment of the component is not successful in addressing the error incident.

In some aspects, the techniques described herein relate to a computing device, the determining that the error incident has occurred on an electronic device including determining a validity of the error incident.

In some aspects, the techniques described herein relate to a computing device, the acts further including: receiving a level of information requested from the remote error logging system; and transmitting an additional report to the remote error logging system based on the level of information.

In some aspects, the techniques described herein relate to a computing device, wherein the report includes at least one of contextual information, component information, or device information.

In some aspects, the techniques described herein relate to a method, receiving, by an error logging system, data associated with an error incident that has occurred on a remote electronic device; identifying a report of a similar error incident to the error incident that is stored by the error logging system; identifying an adjustment based on the report that resolved the similar error incident; and sending the adjustment to the remote electronic device.

In some aspects, the techniques described herein relate to a method, further including: receiving the report from the remote electronic device; and determining whether the error incident was a critical error incident based on the report.

In some aspects, the techniques described herein relate to a method, further including: determining whether the remote electronic device is in idle mode; and responsive to determining that the remote electronic device is in the idle mode, transmitting a modification for implementation on the remote electronic device.

In some aspects, the techniques described herein relate to a method, further including determining a level of information to request from the remote electronic device.

In some aspects, the techniques described herein relate to a method, wherein the adjustment includes an instruction to amend a sequence of behavior of the remote electronic device.

In some aspects, the techniques described herein relate to a method, further including determining which data to store as a differential report of the error incident.

What is claimed is:

1. A method comprising:
   determining that an error incident has occurred on an electronic device;
   determining a component of the electronic device where the error incident occurred;
   responsive to the error incident, handling the error incident by:
      querying a remote error logging system for reports of the error incident by one or more additional electronic devices, the querying including debugging the component on the electronic device and determining that no local modification is available;

determining that the error incident has not been reported by the one or more additional electronic devices; and transmitting, by the electronic device, a report of the error incident and an additional report of the error incident on the component to the remote error logging system.

2. The method as recited in claim 1, further comprising:
determining that the error incident has been reported by the one or more additional electronic devices; and
applying an adjustment to the electronic device based on adjustments applied to the one or more additional electronic devices.

3. The method as recited in claim 1, the determining that the error incident has occurred on the electronic device comprising determining a validity of the error incident.

4. The method as recited in claim 1, further comprising:
receiving a level of information requested from the remote error logging system; and
transmitting an additional report to the remote error logging system based on the level of information.

5. The method as recited in claim 1, wherein the report includes at least one of contextual information, component information, or device information.

6. A computing device comprising:
a processor implemented in hardware; and
a computer-readable storage medium having stored there on multiple instructions that, responsive to execution by the processor, cause the processor to perform acts including:
determining, by the computing device, that an error incident has occurred;
responsive to the error incident, handling the error incident by:
querying a remote error logging system for reports of the error incident;
determining, based on a received query result from the remote error logging system, a differential report indicating a difference between reports of the received query result and the error incident; and
transmitting, by the computing device, the differential report of the error incident to the remote error logging system.

7. The computing device as recited in claim 6, the acts further comprising:
determining that the error incident has been reported to the remote error logging system based on the received query result; and
applying an adjustment to the computing device based on the received query result.

8. The computing device as recited in claim 6, the acts further comprising:
determining a component of the computing device where the error incident occurred;
identifying a report of the error incident on the component; and
transmitting the report to the remote error logging system.

9. The computing device as recited in claim 8, the querying the remote error logging system for the reports of the error incident comprising:
debugging the component on the computing device; and
determining that a local adjustment of the component is not successful in addressing the error incident.

10. The computing device as recited in claim 6, the determining that the error incident has occurred on an electronic device comprising determining a validity of the error incident.

11. The computing device as recited in claim 6, the acts further comprising:
receiving a level of information requested from the remote error logging system; and
transmitting an additional report to the remote error logging system based on the level of information.

12. The computing device as recited in claim 6, wherein the report includes at least one of contextual information, component information, or device information.

13. A method comprising:
receiving, by an error logging system, data associated with an error incident that has occurred on a remote electronic device;
responsive to the data associated with the error incident, handling the error incident by:
identifying a report of a similar error incident to the error incident that is stored by the error logging system;
sending the report to the remote electronic device; and
receiving, from the remote electronic device, a differential report indicating a difference between the report stored by the error logging system and the error incident.

14. The method as recited in claim 13, further comprising:
transmitting an additional report to the remote electronic device indicating whether the error incident was a critical error.

15. The method as recited in claim 13, further comprising:
determining whether the remote electronic device is in idle mode; and
responsive to determining that the remote electronic device is in the idle mode, transmitting a modification for implementation on the remote electronic device.

16. The method as recited in claim 13, further comprising determining a level of information to request from the remote electronic device.

17. The method as recited in claim 13, further comprising transmitting, to the remote electronic device, an adjustment to be applied at the remote electronic device to handle the error incident.

18. The method as recited in claim 17, wherein the adjustment includes an instruction to amend a sequence of behavior of the remote electronic device.

19. The method as recited in claim 17, wherein the adjustment includes a change in one or more settings of the remote electronic device.

20. The method as recited in claim 13, wherein the report includes at least one of contextual information, component information, or device information.

* * * * *